United States Patent [19]
Fliervoet et al.

[11] Patent Number: 4,662,655
[45] Date of Patent: May 5, 1987

[54] PIPE CONNECTION OF FIBRE REINFORCED PLASTIC PIPE PARTS

[75] Inventors: Johannes H. M. Fliervoet, Borne; Oege R. Offringa, Hardenberg, both of Netherlands

[73] Assignee: Wavin B.V., Zwolle, Netherlands

[21] Appl. No.: 650,460

[22] Filed: Sep. 14, 1984

[30] Foreign Application Priority Data

Sep. 15, 1983 [NL] Netherlands .......................... 8303190

[51] Int. Cl.$^4$ ............................................. F16L 35/00
[52] U.S. Cl. ....................................... 285/24; 285/156; 285/175; 285/179; 285/293; 285/369; 285/383; 285/423; 285/915
[58] Field of Search .................. 285/21, 24, 369, 383, 285/417, 423, 915, 292, 175, 293, 179, 156

[56] References Cited

U.S. PATENT DOCUMENTS

| | | | |
|---|---|---|---|
| 1,706,525 | 3/1929 | Gullion | 285/179 X |
| 2,234,643 | 3/1941 | Grant | 285/369 X |
| 2,785,910 | 3/1957 | Munger | 285/DIG. 16 |
| 3,053,724 | 9/1962 | Galloway | 285/293 X |
| 3,744,823 | 7/1973 | Muir et al. | 285/423 X |
| 3,977,704 | 8/1976 | Meyer | 285/423 X |
| 4,011,652 | 3/1977 | Black | 285/292 X |
| 4,147,381 | 4/1979 | Schwarz | 285/293 X |
| 4,398,754 | 8/1983 | Caroleo et al. | 285/DIG. 16 |
| 4,514,244 | 4/1985 | Shaefer et al. | 285/156 X |

FOREIGN PATENT DOCUMENTS

| | | | |
|---|---|---|---|
| 152083 | 7/1950 | Australia | 285/423 |
| 2911714 | 2/1976 | Fed. Rep. of Germany | 285/156 |
| 49614 | 4/1979 | Japan | 285/423 |

*Primary Examiner*—Dave W. Arola
*Attorney, Agent, or Firm*—Wilkinson, Mawhinney & Theibault

[57] ABSTRACT

A pipe connection of a first and a second fibre reinforced plastic pipe by accommodating a free end portion of each pipe in a centering plastic pipe part, an adhesive layer being present between the inner side of the centering pipe part and the outer side of the free end portions. A reinforcing layer extends over the centering pipe part and over parts of the first and second pipe part adjoining the free ends of the centering pipe part, preferably the centering pipe part has a smaller wall thickness than the wall thickness of the first and second pipe parts.

The free end portions have a smaller wall thickness than the wall thickness of the centering pipe part.

The centering pipe part may be formed as a bend, or part of a saddle or branch saddle and consists of a reinforced thermosetting plastic material.

The bend may be formed from a plurality of standard bend parts of relatively small length, e.g. 5° or 10°, each having an end widening and a bend part end portion of a consecutive bend part penetrating into said widened end, an adhesive layer engaging said penetrating bend part end portion and the opposite inner wall of the widening.

The fibre reinforced plastic pipes, the centering pipe part and the reinforcing layer all consist of thermosetting resin.

6 Claims, 9 Drawing Figures

PIPE CONNECTION OF FIBRE REINFORCED PLASTIC PIPE PARTS

BACKGROUND OF THE INVENTION

This invention relates to a pipe connection interconnecting a first fibre reinforced plastic pipe part and a second fibre reinforced plastic pipe part, comprising an adhesive connection between the two pipe parts and a reinforcing layer, extending over the adhesive connection, and over the pipe part portions adjoining the adhesive connection and cooperating with same.

A pipe connection of this type, consisting of a first fibre reinforced plastic pipe part interconnected with a second fibre reinforced plastic pipe part consisting of a thermosetting resin, e.g. epoxy resin and comprising an adhesive connection is known in the art.

To obtain such a connection a first and second fibre reinforced plastic pipe part are sawn off in a straight manner or if curves are to be made preferably mitre sawn, whereupon the front end portions so obtained are placed opposite each other and the slit between said front end portions is subsequently filled with a filler glue or resin whether reinforced by means of a fibrous web or not. To obtain the desired strength of the obtained connection a laminate layer of a fibre reinforced thermosetting resin is wrapped around the outer side of the end portion of the first fibre reinforced plastic pipe part and around the opposite end portion of the second fibre reinforced plastic pipe part.

However, several disadvantages may arise with regard to such a connection and the production thereof:

(a) firstly it is very difficult to accurately saw off the end portions of the two pipe parts, especially in case mitre sawn pipe end portions are desired;

(b) the fibre reinforced filler glue or resin for filling the slit between the two plastic pipe parts to be interconnected, does not always adhere satisfactorily, so that leakages might take place in a pipe conduit, (c) between the free end portions of the fibre reinforced plastic pipe parts and the laminate layer wrapped around them delamination may easily occur, (d) especially in the event of greater pipe diameters it is extremely difficult to accurately place the front end portions of the first and second fibre reinforced plastic pipe parts to be interconnected, opposite each other, thus enhancing the risk of future leakages occurring.

SUMMARY OF THE INVENTION

The present invention aims to provide a pipe connection of the kind as described above by means of which said disadvantages are overcome, while, more particularly, it is ensured that a reliable seal of the connection will be obtained.

This object is attained according to the invention in that a free end portion of the first fibre reinforced plastic pipe part and a free end portion of the second fibre reinforced plastic pipe part are accommodated in a centering pipe portion, the adhesive connection at least extending between the free end portions of the first and the second plastic pipe part and the centering pipe portion.

The use of such a centering pipe portion will result in an optimum adhesive connection between the first fibre reinforced plastic pipe part and the second fibre reinforced plastic pipe part, ensuring a very reliable seal. In addition the first and second fibre reinforced plastic pipe part to be interconnected can easily be centered in the correct manner, so that the strength of the adhesive connection is improved in this manner too.

Moreover mitre sawing plastic pipe parts to obtain a curve has thereby become redundant.

In an advantageous embodiment at least one side of the centering pipe portion is provided with an internal abutment surface, so that an optimum centering action is guaranteed, especially when the abutment surface is an annular abutment collar.

Very advantageously the wall thickness of the free end portions of the first and second fibre reinforced plastic pipe parts is smaller than that of the portions adjoining them so that in the finished connection the outer diameter of the centering pipe portion may correspond to the outer diameter of the first and second fibre reinforced plastic pipe part, a laminate connection of a homogeneous thickness resulting therefrom, when applying a laminate layer. Said features all contribute to obtaining a very reliable seal between the two plastic pipe parts.

According to a preferred embodiment the centering pipe portion is a thinwalled socket pipe portion.

The centering pipe portion may also advantageously be a bend, the reinforcing layer then extending over the end portions of the first and second plastic pipe part and over the aforementioned bend.

In case the centering pipe portion is provided with an abutment collar, the inner diameter of the said collar substantially corresponds to the inner diameter of the first and second plastic pipe part.

SURVEY OF THE DRAWINGS

FIG. 3 is a bend comprising connections according to the invention;

DESCRIPTION OF THE PREFERRED EMBODIMENTS

Figure 1A:
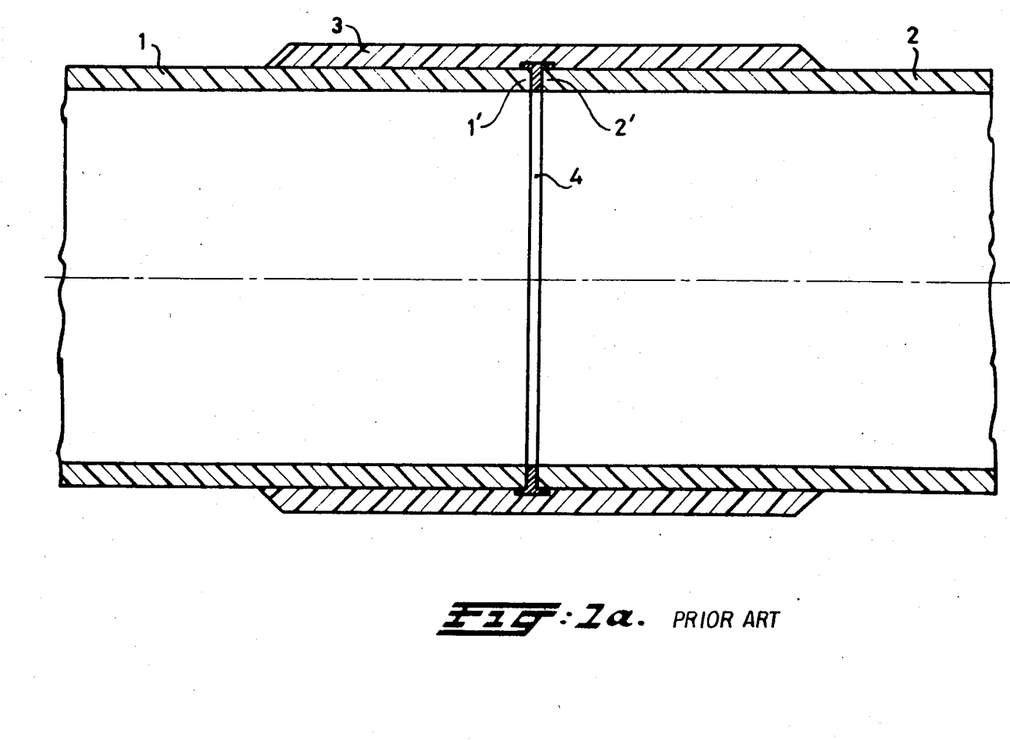
FIG. 1a is a connection of a first fibre reinforced plastic pipe part and a second fibre reinforced plastic pipe part, according to the state of art.

FIG. 1a illustrates a connection, known per se, of a first fibre reinforced plastic pipe part 1 with a second fibre reinforced plastic pipe part 2, the front end portions 1', 2' of the two fibre reinforced plastic pipe parts being placed opposite each other so that a slit is otained, filled with a filler glue or resin whether or not reinforced by a fibrous web. The pipes 1 and 2 consist of polyester or epoxy resin reinforced by glass filaments.

To obtain the required connecting strength a reinforcing layer 3 in the form of a laminate layer, is wrapped around the outer side of the first fibre reinforced plastic pipe part 1 and the outer side of the second fibre reinforced plastic pipe part 2.

Said known connection is disadvantageous in that its seal is inappropriate because of the difficulties arising when trying to correctly place opposite each other the front ends of the fibre reinforced plastic pipe parts 1 and 2; in addition an optimum adherence of the filler glue or resin to the pipe parts cannot be obtained.

Figure 1B:
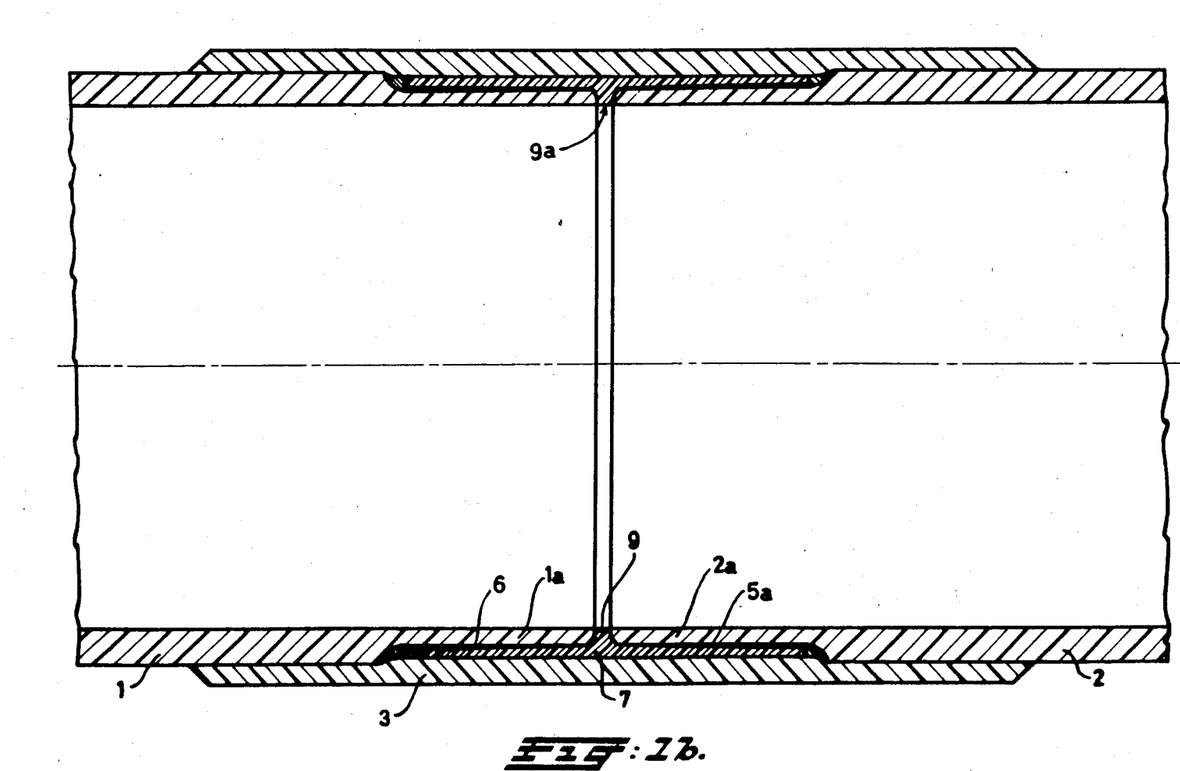
FIG. 1b is a connection of a first fibre reinforced plastic pipe part with a second fibre reinforced plastic pipe part, according to the present invention.

FIG. 1b illustrates a connection according to the invention, comprising a first fibre reinforced plastic pipe part 1 of polyester resin and a second fibre reinforced plastic pipe part 2 of polyester resin, provided with pipe end portions 1a, 2a respectively, the wall thickness of same being smaller than the wall thickness of the parts adjoining them, said end portions being accommodated in a centering pipe portion 7 in the form of a thinwalled socket comprising an annular abutment collar.

A good connection and seal are ensured by means of an annular glue layer 6 between the end portion 1a and the centering pipe portion 7. In the same manner an annular glue layer 5 connects the end portion 2a with the other side of the centering pipe portion 7. A laminate layer 3 is wrapped around the outer side of the centering pipe portion 7 and the adjoining portions of the two plastic pipe parts 1 and 2.

In this manner an optimum tight connection is obtained between the centering pipe portion 7 and the plastic pipe parts 1 and 2. The inner diameter of the inner wall 9a of the collar 9 of the centering pipe portion 7 substantially corresponds to the inner diameter of the first and second fibre reinforced plastic pipe part 1, 2.

Figure 2:
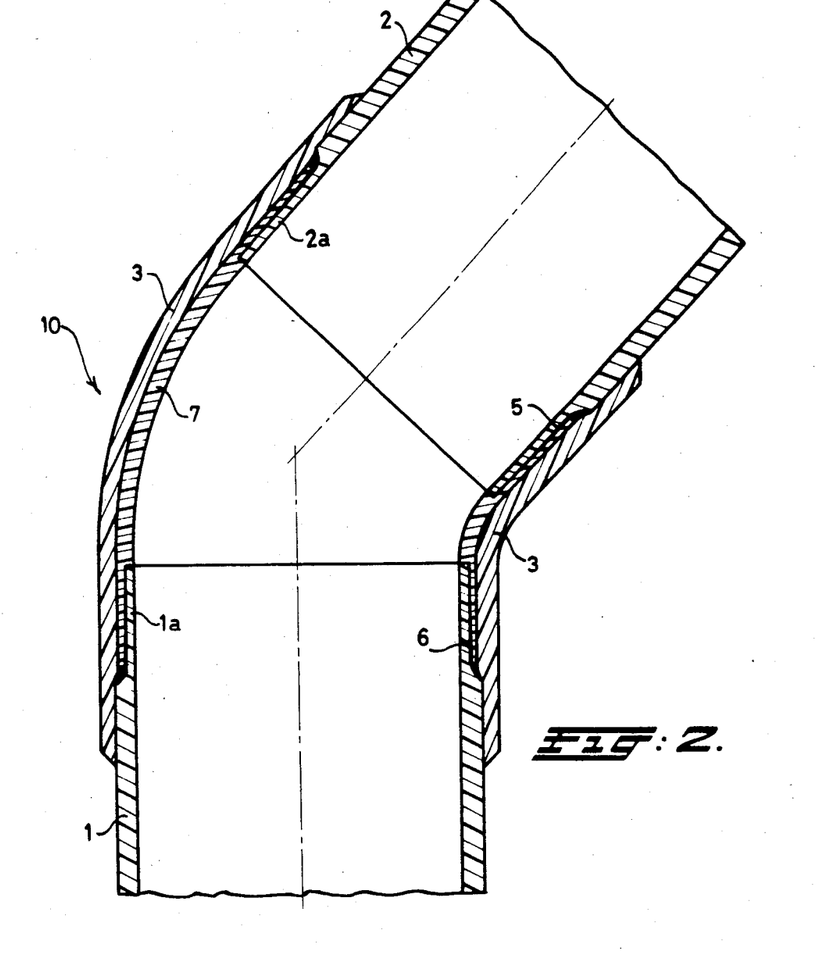
FIG. 2 is, according to the invention, a connection when forming a bend in a conduit.

FIG. 2 illustrates a bend connection 10 between a first fibre reinforced plastic pipe part 1 and a second fibre reinforced plastic pipe part 2. Both fibre reinforced plastic pipe parts 1, 2 are provided with end portions having a reduced wall thickness and being accommodated in the centering pipe portion 7, in this case having the form of a bend. The connection between the centering pipe portion 7 having the form of a bend and the end portions 1a, 2a resp. of the fibre reinforced plastic pipe parts 1, 2 is obtained in a manner corresponding to the one illustrated in FIG. 1b, to wit by means of annular glue layers 6, 5 resp.

A laminate layer 3 is wrapped around the centering pipe portion 7 in the form of a bend, said laminate layer extending upon the outer side of the first fibre reinforced plastic pipe part 1 and upon the outer side of the second fibre reinforced plastic pipe part 2.

FIG. 3 illustrates a bend 11 obtained by applying a connection according to the invention. In a thinwalled centering pipe portion 7 in the form of a socket having an abutment collar 9 is accommodated the end portion 12a of a pipe part 12, said end portion 12a having a reduced wall thickness, a glue layer extending between said end portion and the inner side of the centering pipe portion 7.

On the other hand there is accommodated in and adhered by means of an adhesive to the socket-shaped centering pipe portion 7, the end portion 18a of a fibre reinforced bend 18, said end portion also having a reduced wall thickness.

The other side of the bend 18, also being provided with an end portion 18b with a reduced wall thickness, is accommodated in a second socket-shaped centering pipe portion 7 comprising an abutment collar 9.

On the other hand there is accommodated in this second socket-shaped centering pipe portion 7 the end portion 13a of a pipe part 13, said end portion having a reduced wall thickness. In this case too there are provided glue layers 5 and 6 between the outer side of end portion 13a of pipe part 13, the thinned end portion 18b of the bend 18 respectively and the inner side of the socket-shaped centering pipe portion 7.

In FIG. 3 the pipe part 12 is a spigot end portion and the pipe part 13 a socket end portion.

A reinforcing laminate layer 3 is wrapped around the bend and also extends to beyond the outer side of the socket end 13 and the outer side of the spigot end 12.

Due to the above features finally the bend 11 is obtained.

Figure 4:
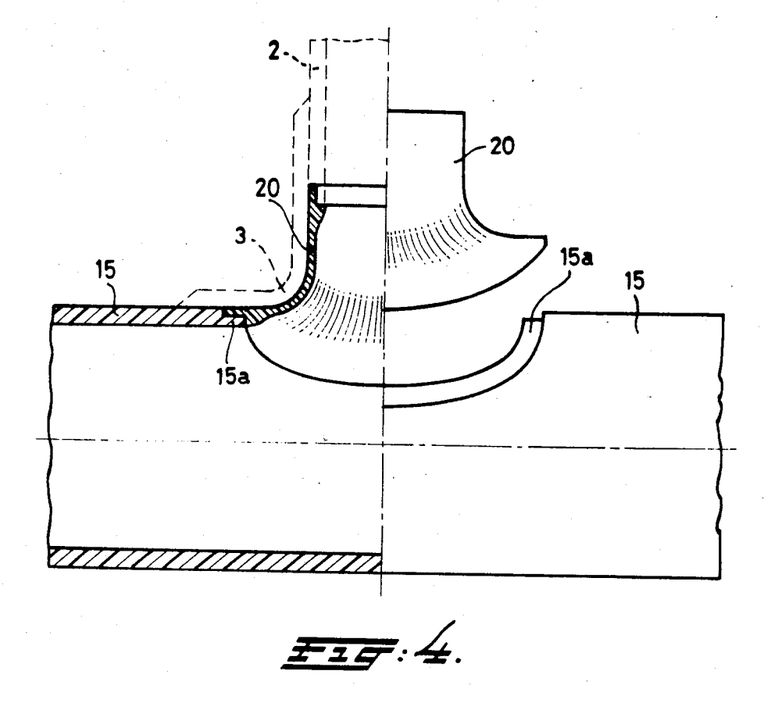
FIG. 4 is, according to the invention, a connection as used in the case of a branch saddle portion.

FIG. 4 illustrates an additional modified embodiment of the connection according to the present invention.

The centering pipe portion has the form of a thinwalled branch saddle portion.

The wall of the first fibre reinforced plastic pipe part 15 is provided with a portion 15a having a reduced wall thickness, the recess formed at the outer side of pipe part portion 15a and provided on producing said pipe part portion, serving for accommodating the branch saddle portion 20.

Figure 4A:
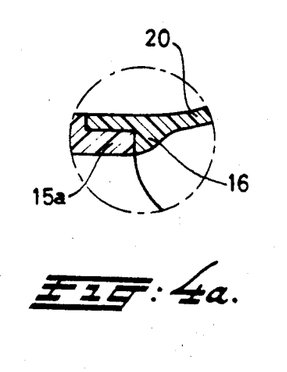
FIG. 4a is a detail of FIG. 4.

FIG. 4a illustrates the connection formed at the location of the thinned portion 15a; it should be noted that it is in certain cases preferable to provide the inner side of the branch saddle portion 20 with a shoulder 16, so as to obtain a reliable well-sealed connection.

Figure 4B:
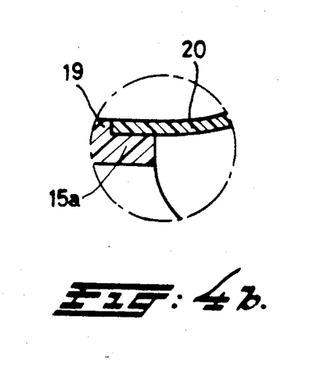
FIG. 4b is a modified method of interconnecting a pipe portion with a branch saddle portion.

Obviously it is also possible to obtain a proper connection as illustrated in FIG. 4b, showing a recess with its transitional surface 19 and formed by the portion 15a, serving to accommodate the edge of the branch saddle portion 20.

In addition a second fibre reinforced plastic pipe part 2 is accommodated in the saddle-shaped centering pipe portion 20, an adhesive layer then extending between the end portion of the second fibre reinforced plastic pipe part 2 and the inner side of the centering pipe portion 20.

Figure 5:
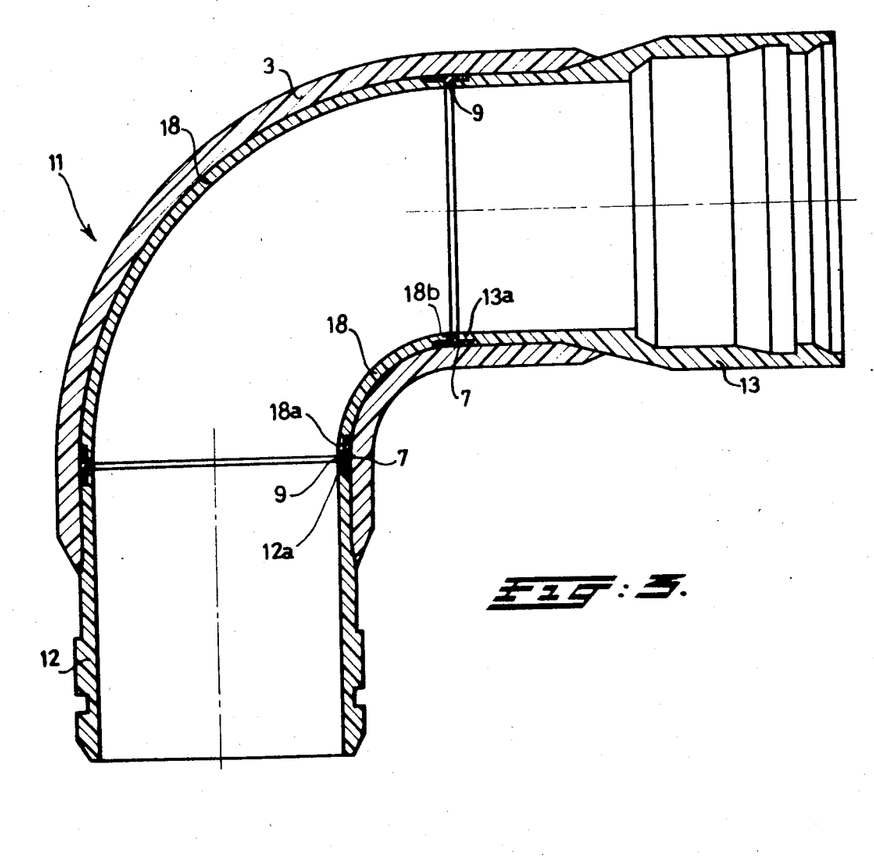
FIG. 5 shows a modified bend in a connection according to the invention.

FIG. 5 shows a pipe connection according to the invention interconnecting a first and a second fibre reinforced plastic pipe 21, 22 respectively.

The bend 28 has been formed by interconnecting a plurality of standard bent parts 28a–28e of e.g. 5° or 10°. Each standard bent part is a thinwalled fibre reinforced plastic bend part provided with an end widening 29 so that two consecutive bend parts 28a–28e are connected by means of a spigot-socket connection 30 and an adhesive layer 25 between the outer side of widening 29 and the opposite wall of penetrating bend part end portion 31.

Figure 5A:
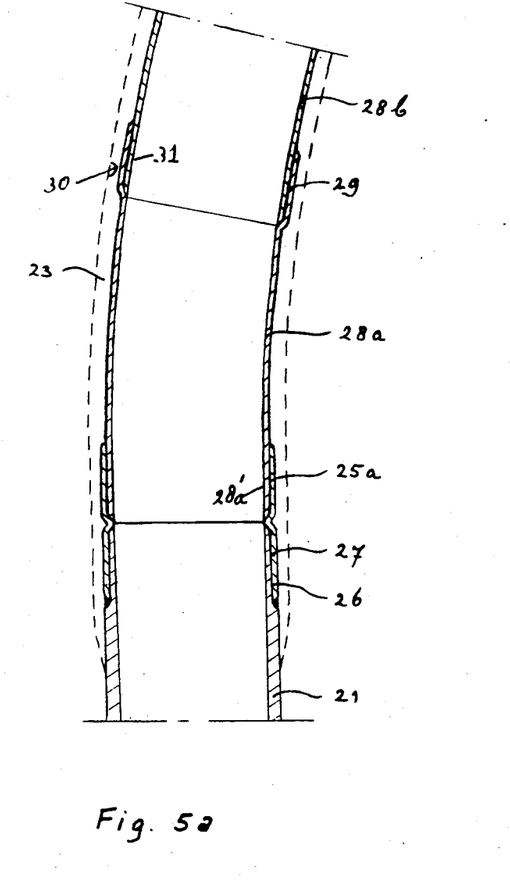
FIG. 5a shows a part of the modified bend according to FIG. 5, at the connection with the first fibre reinforced plastic pipe part.
Figure 5B:
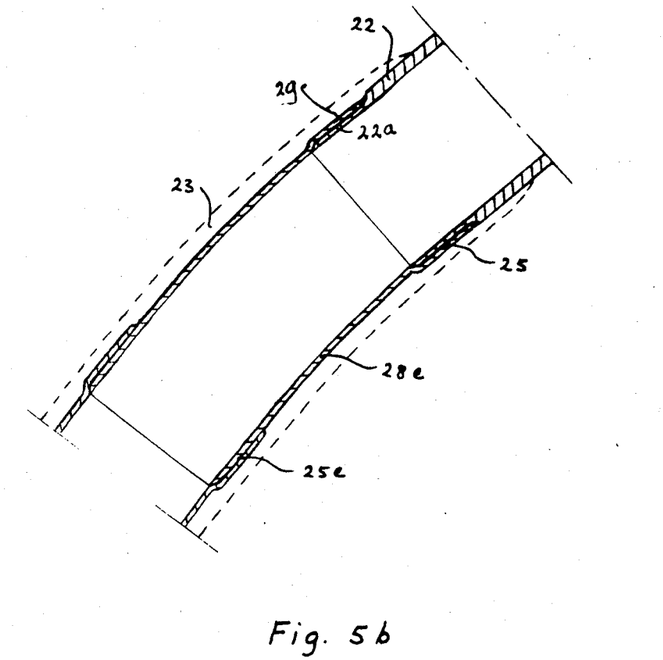
FIG. 5b shows a part of the modified bend according to FIG. 5 at the connection with the second fibre reinforced plastic pipe part.

A thinned free end portion 22a of the second fibre reinforced plastic pipe 22 is accommodated in widening 29 of a standard bent part 18e.

A thinned free end portion 21a of a first fibre reinforced plastic pipe part 21 is accommodated in one end of socket 27 of fibre reinforced plastic material and a free end portion 28a' of a bent part 28a is accommodated in the other end of the socket, an adhesive layer 25 connects the socket 27 with portion 28' and free end portion 21a.

A reinforcing layer 23 has been wound around bend 28 and adjoining portions of plastic pipes 21 and 22.

Starting from equal standard bent parts 28a–28e of e.g. 10° any desired bend can be formed. This simplifies the production of bends as no separate moulds are required for forming bends of different lengths and moreover simple moulds are sufficient for manufacturing said standard bent parts. At last these standard bent parts can be produced at low costs as they can be manufactured by an automatic winding process in contrast to the long integral bends as presently used.

What is claimed is:

1. A pipe connection interconnecting a first fibre reinforced plastic pipe part and a second fibre reinforced plastic pipe part, the wall thickness of the free end portions of the first and second pipe part being smaller in outer diameter than the portions adjoining them, comprising an adhesive connection between the two pipe parts and a reinforcing layer being formed by wrappping a laminate with with thermosetting resin around the connection and extending over the adhesive connection and over the pipe part portions adjoining the adhesive connection, and cooperating with same, said adhesive connection comprising a centering pipe portion of fibre reinforced plastic materials accommodating a free end portion of the first and second fibre reinforced plastic pipe parts, said centering pipe portion extending over the outer side of said free end portions and being connected to said free end portions solely by means of an adhesive layer between said centering pipe portion and said free end portions and said centering pipe portion having a maximum wall thickness which is substantially smaller than the wall thickness of the first and second pipe parts, at least one side of the centering pipe portion being provided with an internal abutment surface, the internal diameter of said abutment surface substantially corresponding to the inner diameter of said first and the second pipe part.

2. A pipe connection according to claim 1, wherein the centering pipe portion is a socket-shaped centering pipe portion.

3. A pipe connection according to claim 1, wherein the centering pipe portion is a bend.

4. A pipe connection according to claim 1, wherein a centering pipe portion forms a branch saddle portion.

5. A pipe connection according to claim 1 further comprising a bend formed by a plurality of interconnected bend parts, each bend part having a widened end engaged by an adhesive layer, a free end portion of an adjacent bend part penetrating into said widened end.

6. A pipe connection according to claim 5, comprising a plurality of equal interconnected bend parts of a relatively small length.

* * * * *